A. PEVEY.
Processes for Preparing Iron Chips, &c., for Remelting.

No. 140,383.    Patented July 1, 1873.

Inventor,
Abiel Pevey

Witnesses,
Josiah H. Drummond
Charles Drummond

UNITED STATES PATENT OFFICE.

ABIEL PEVEY, OF PORTLAND, MAINE.

IMPROVEMENT IN PROCESSES FOR PREPARING IRON CHIPS, &c., FOR RE-MELTING.

Specification forming part of Letters Patent No. 140,383, dated July 1, 1873; application filed June 28, 1872.

*To all whom it may concern:*

Be it known that I, ABIEL PEVEY, of Portland, in the county of Cumberland and State of Maine, have invented certain improvements in preparing iron chips, borings, scraps, turnings, shavings, and similar small pieces or particles of iron for remelting, of which the following is a specification:

The nature of my invention consists in aggregating or massing together such iron chips, borings, scraps, turnings, shavings, and other pieces or particles, after wetting or mixing them with a solution of lime in water (or white-wash) and beer returns, or sour beer, or any liquid of a sticky nature, (which also serves as a flux,) into a core or cake, by ramming or pressing them into a core-box of a conical or other convenient shape, and inclosing said core in a continuous cast-iron shell, basket, or netting, by running said basket or netting or shell about said core in a flask of shape similar to that of the core-box, and properly grooved, as hereinafter described; the object being to hold said pieces and particles of iron together for purposes of handling and transportation, and also to prevent them from being blown out of the furnace by the blast while melting.

The invention described in Letters Patent No. 14,114, granted to me January 15, A. D. 1856, had for its object to confine the small particles of iron within a cast-iron vessel so that the vessel and its contents might be melted together. This vessel was molded in sand, and the expense of making the same was considerable, and the sand necessarily adhering to the cast-iron vessel increased the amount of slag in the furnace, clogging the furnace and retarding the melting of the iron. The invention herein described supersedes the expense of molding the vessels, and not only cements together the particles of iron into a cake or core, but the lime also serves as a flux, and promotes the fusion of the iron.

The accompanying drawings serve to explain my invention.

Figure 1:
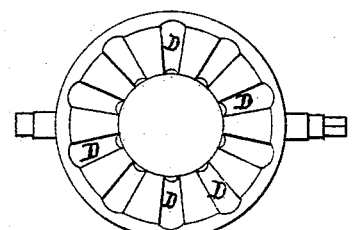
Figure 3:
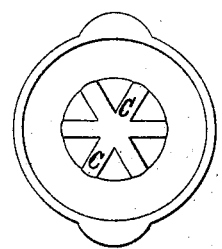
Figure 2:
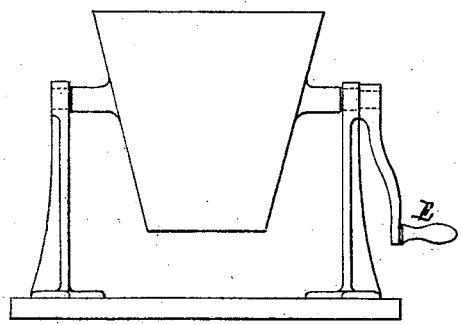
Figure 4:
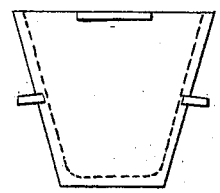
Figure 5:
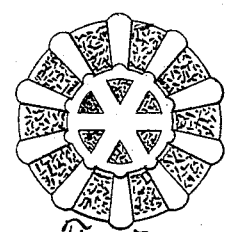
Figure 6:
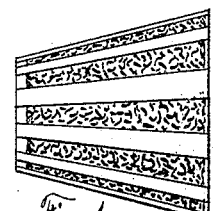

Figure 1 is a plan of the flask or mold with trunnions, showing the grooves running from the top to the bottom of the flask. Fig. 2 is an elevation of a flask or mold provided with trunnions and a crank, and supported upon uprights. Fig. 3 is a plan of the core-box. Fig. 4 is an elevation of the same. Fig. 5 is a plan of the core inclosed with the cast-iron basket. Fig. 6 is an elevation of the same.

I accomplish my purpose substantially as follows: Mix slacked lime (or any other substance which is sticky and also acts as a flux, or promotes the fusion of iron) and water or sour beer, or beer returns, until the mixture is of about the consistency of cream. With this mixture dampen the iron particles. Then place a small quantity of these dampened iron particles in the core-box, which is shaped like the frustum of an inverted cone, (Figs. 3 and 4,) and ram them down hard, and fill the core-box by gradually pressing or ramming down small quantities at a time of the moist-end iron particles until the core-box is full. The top of the core is made round or flat. Then a concavo-convex or flat plate is placed upon the top of the core-box with the concave or flat surface, as the case may be, turned down against the core. The core-box, with the plate still on it, is then inverted, and the core-box is lifted from the plate, leaving the core resting upon said plate. The core is less liable to crumble when the small end is up. The core is then lifted by the plate and placed in an oven to dry, or it may be dried merely by exposure to the atmosphere. The core-box has radial ribs or corrugations on the bottom, on the inside, as seen at C, and these cause the bottom of core to have radial grooves. After being dried so that it can be handled the core is placed with its small end down in the flask, (Figures 1 and 2,) which flask is in shape like the core-box, the core coming to within about an inch from the top of the flask—that is, the flask is about an inch longer on the inside than the core, and the core fits the flask except that the flask has a number of semicircular recesses or grooves running from top to bottom on its inside, as shown at D in Fig. 1. On the top of the flask is then placed a fender, being a flat ring of cast-iron, having on its under side lips which keep said fender in its place on the flask. The fender keeps the melted iron from flying if the flask happens to be too cold or damp, but may be dispensed with, if sufficient care is taken to heat the flask before pouring. Melted iron is then poured onto the center of the top of the core or cake, filling the grooves in the flask and also filling the grooves in the bottom of the core, and, finally, covering the top of the core with a thin layer of cast-iron. Sometimes the melted iron raises the core in the flask, in which case the entire core may be covered with a sheet of cast-iron. As soon as the cast-iron hardens the flask is inverted by means of the crank E, (Fig. 2,) another core is placed in the flask, and the operation is repeated, thus repeating the operation without interruption to any extent required, leaving the core or cakes perfectly free from sand and any and all non-conducting properties. The core after being thus inclosed is ready for remelting, or for transportation.

I prefer to make my flask, core, and core-box, of the shape of a frustum of a cone, as that shape allows the core to be easily removed from the core-box, and afterward from the flask; but I do not confine myself to that shape. A convenient size of the core and the inclosing-basket is about one hundred and twenty pounds, of which the basket weighs from seventeen to twenty-five pounds. Instead of making the core entirely of wet shavings, &c., or particles, a wooden plug may be placed erect in the center of the core-box, after a layer of damp particles, &c., of an inch or two inches in thickness has been made in the bottom of the core-box, and damp particles rammed about it until the box is full. The plug is then withdrawn and its place filled with dry iron particles. This hastens the drying of the core.

The advantages of this method are obvious. The cost of preparing iron particles for remelting by the above process is slight. The lime acts as a flux and improves the quality of the iron, and there is no substance in the cores, as thus prepared, which has any tendency to clog the furnace, or produce slag, and the cores or blocks when thus inclosed, or partially inclosed, may be transported.

I disclaim the use of clay and similar earthy substances, which do not form a flux, but promote the formation of slag, clog the furnace, and hinder or retard the fusion of the iron, as all founders are aware that clay is a non-conductor, and is used to prevent iron from melting rather than to promote the fusion of the same.

I claim—

1. The method herein described of forming a core or block of iron chips, scraps, or other small pieces or particles of iron, for the purpose herein set forth.

2. The method herein described of forming a core or block of iron chips, scraps, or other small pieces or particles of iron by wetting said pieces or particles of iron with a solution of lime in water, and then pressing said pieces or particles into molds, for the purpose herein described.

3. The method of uniting pieces or particles of iron into a core, cake, or block, by wetting said pieces or particles of iron with a liquid solution of lime, and then pressing them together, as and for the purpose herein described.

ABIEL PEVEY.

Witnesses:
JOSIAH H. DRUMMOND,
CHARLES L. DRUMMOND.